United States Patent
Satyarth

(10) Patent No.: US 11,188,311 B2
(45) Date of Patent: Nov. 30, 2021

(54) AUTOMATED SOFTWARE GENERATION THROUGH MUTATION AND ARTIFICIAL SELECTION

(71) Applicant: Microsoft Technology Licensing, LLC

(72) Inventor: Arun S. Satyarth, Karnataka (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/589,029

(22) Filed: Sep. 30, 2019

(65) Prior Publication Data

US 2021/0096831 A1 Apr. 1, 2021

(51) Int. Cl.
  *G06F 8/36* (2018.01)
  *G06F 11/36* (2006.01)
  *G06F 8/71* (2018.01)

(52) U.S. Cl.
  CPC .......... *G06F 8/36* (2013.01); *G06F 8/71* (2013.01); *G06F 11/3688* (2013.01); *G06F 11/3692* (2013.01)

(58) Field of Classification Search
  USPC ........................................ 717/108
  See application file for complete search history.

(56) References Cited

U.S. PATENT DOCUMENTS

| | | | | |
|---|---|---|---|---|
| 6,067,639 A * | 5/2000 | Rodrigues | .......... | G06F 11/3688 714/38.11 |
| 6,408,403 B1 * | 6/2002 | Rodrigues | .......... | G06F 11/3688 714/38.11 |
| 6,505,342 B1 * | 1/2003 | Hartmann | .......... | G06F 11/3688 714/E11.208 |
| 6,681,383 B1 | 1/2004 | Pastor et al. | | |
| 8,984,348 B2 * | 3/2015 | Lau | ...................... | G06F 11/3684 714/46 |
| 9,319,270 B2 | 4/2016 | Bestmann et al. | | |
| 10,324,690 B2 | 6/2019 | Ouali | | |

(Continued)

OTHER PUBLICATIONS

"CodeSmith Generator", Retrieved From: https://web.archive.org/web/20101006020516/https://www.codesmithtools.com/product/generator, Oct. 6, 2010, 1 Page.

(Continued)

*Primary Examiner* — John Q Chavis
(74) *Attorney, Agent, or Firm* — NovoTechIP International PLLC

(57) ABSTRACT

Techniques for automatically generating a target software object herein include accessing an initial version of a candidate software object that does not satisfy one or more functional requirements; mutating executable binary object code of the initial version of the candidate software object to generate a first intermediate version; testing the first intermediate version to determine whether the first intermediate version satisfies at least one of the one or more functional requirements by executing the first intermediate version and a set of automated tests; and continuing to mutate and test the candidate software object through successive intermediate versions of the candidate software object until a version of the candidate software object satisfies all of the one or more functional requirements, wherein each successive intermediate version of the candidate software satisfies at least one functional requirement not satisfied by preceding versions of the candidate software object.

18 Claims, 6 Drawing Sheets

(56) References Cited

U.S. PATENT DOCUMENTS

| | | | |
|---|---|---|---|
| 2002/0046394 A1* | 4/2002 | Do | G06F 8/20 |
| | | | 717/108 |
| 2005/0137992 A1 | 6/2005 | Polak | |
| 2006/0174097 A1 | 8/2006 | Brawn et al. | |
| 2012/0011106 A1* | 1/2012 | Reid | G06F 9/466 |
| | | | 707/695 |
| 2016/0246576 A1 | 8/2016 | Cory | |

OTHER PUBLICATIONS

Arcuri, et al., "Co-evolutionary Automatic Programming for Software Development", In Journal of Information Sciences, vol. 259, Feb. 20, 2014, 38 Pages.

Bartlett, Jonathan, "Introduction to Metaprogramming", Retrieved From: https://www.ibm.com/developerworks/linux/library/l-metaprog1/index.html, Oct. 20, 2005, 34 Pages.

Becker, Kory, "Using Artificial Intelligence to Write Self-Modifying/Improving Programs", Retrieved From: http://www.primaryobjects.com/2013/01/27/using-artificial-intelligence-to-write-self-modifying-improving-programs/, Jan. 27, 2013, 23 Pages.

Benfenatki, et al., "Automatic Software Development as a Service (ASDaaS)", In Proceedings of 4th International Conference on Cloud Computing and Services Science, Apr. 3, 2014, pp. 95-102.

Boyd-Rice, Jade, "New A.I. Application Can Write Its Own Code", Retrieved From: https://www.futurity.org/artificial-intelligence-bayou-coding-1740702/, Apr. 25, 2018, 7 Pages.

"International Search Report and Written Opinion Issued in PCT Application No. PCT/US20/038312", dated Sep. 24, 2020, 11 Pages.

* cited by examiner

AUTOMATED SOFTWARE GENERATION THROUGH MUTATION AND ARTIFICIAL SELECTION

BACKGROUND

Software development is a complex process that requires a significant knowledge of at least one programming language and knowledge regarding computing devices upon which the software may be deployed. Complex software can require an entire team of skilled software programmers to implement the software. There are significant areas for new and approved mechanisms for simplifying and automating the software development process.

SUMMARY

A computing device according to a first aspect of this disclosure includes a processor and a computer-readable medium. The computer-readable medium stores executable instructions for causing the processor to perform operations that include accessing an initial version of a candidate software object that does not satisfy one or more functional requirements of the target software object; mutating executable binary object code of the initial version of the candidate software object to generate a first intermediate version of the candidate software object; testing the first intermediate version of the candidate software object to determine whether the first intermediate version of the candidate software object satisfies at least one of the one or more functional requirements by executing the first intermediate version of the candidate software object and a set of automated tests that provide the first intermediate version of the candidate software object with a predetermined set of inputs and determine whether outputs of the first intermediate version of the candidate software output correspond to a predetermined set of outputs; and continuing to mutate and test the candidate software object through successive intermediate versions of the candidate software object until a version of the candidate software object satisfies all of the one or more functional requirements, wherein each successive intermediate version of the candidate software satisfies at least one functional requirement not satisfied by preceding versions of the candidate software object.

A method according to a second aspect of this disclosure is performed by a data processing system for automatically generating a target software object includes accessing via a processor an initial version of a candidate software object that does not satisfy one or more functional requirements of the target software object; mutating via the processor executable binary object code of the initial version of the candidate software object to generate a first intermediate version of the candidate software object; testing via the processor the first intermediate version of the candidate software object to determine whether the first intermediate version of the candidate software object satisfies at least one of the one or more functional requirements by executing the first intermediate version of the candidate software object and a set of automated tests that provide the first intermediate version of the candidate software object with a predetermined set of inputs and determine whether outputs of the first intermediate version of the candidate software output correspond to a predetermined set of outputs; and continuing to mutate and test the candidate software object through successive intermediate versions of the candidate software object until a version of the candidate software object satisfies all of the one or more functional requirements, wherein each successive intermediate version of the candidate software satisfies at least one functional requirement not satisfied by preceding versions of the candidate software object.

A memory device according to a third aspect of this disclosure stores instructions that, when executed on a processor of a computing device, cause the computing device to automatically generate a target software object, by accessing an initial version of a candidate software object that does not satisfy one or more functional requirements of the target software object; mutating executable binary object code of the initial version of the candidate software object to generate a first intermediate version of the candidate software object; testing the first intermediate version of the candidate software object to determine whether the first intermediate version of the candidate software object satisfies at least one of the one or more functional requirements by executing the first intermediate version of the candidate software object and a set of automated tests that provide the first intermediate version of the candidate software object with a predetermined set of inputs and determine whether outputs of the first intermediate version of the candidate software output correspond to a predetermined set of outputs; and continuing to mutate and test the candidate software object through successive intermediate versions of the candidate software object until a version of the candidate software object satisfies all of the one or more functional requirements, wherein each successive intermediate version of the candidate software satisfies at least one functional requirement not satisfied by preceding versions of the candidate software object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
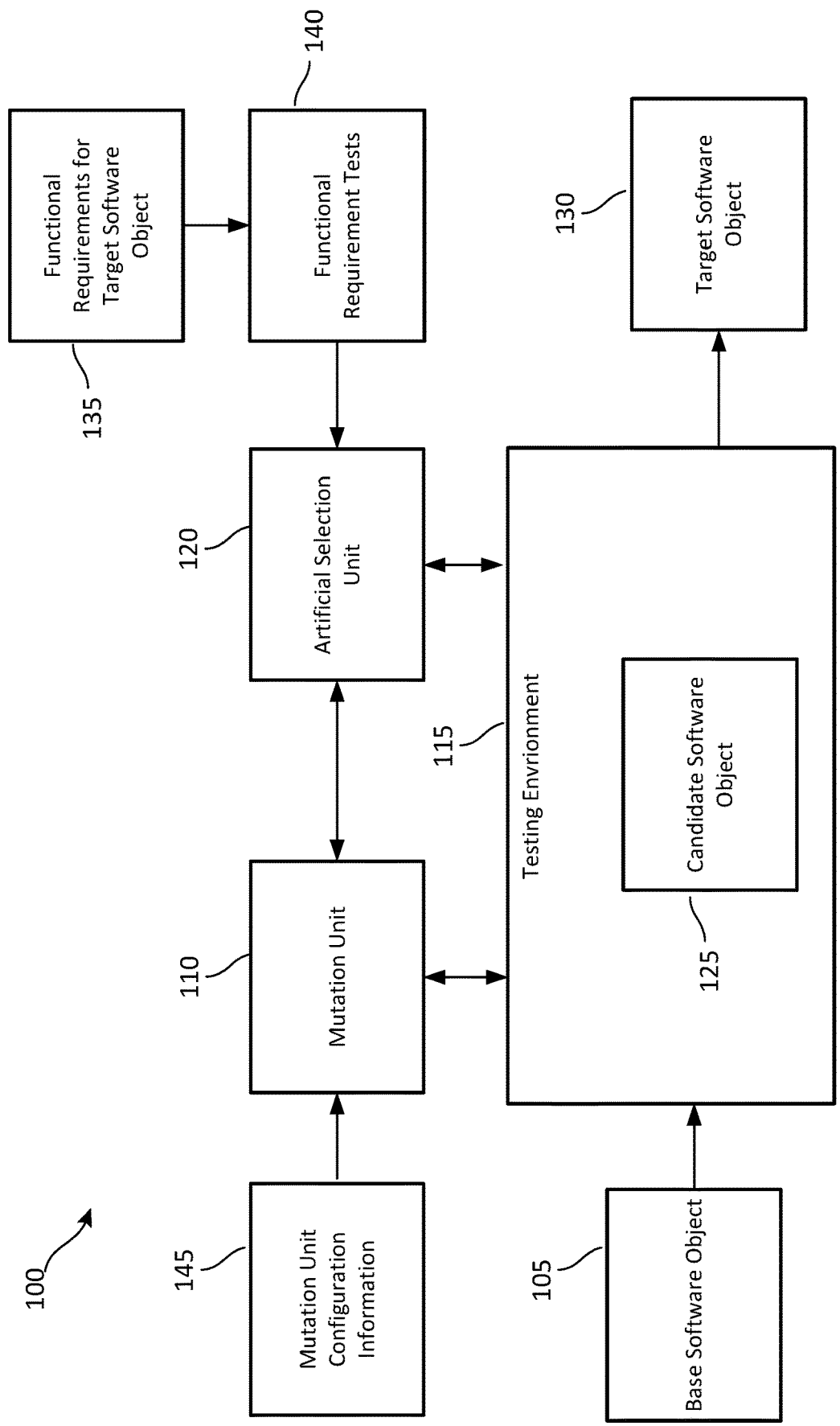
FIG. 1 presents a functional diagram of components of a system for automatically generating program code.

FIG. 1 illustrates an example computing environment 100 in which may be implemented on a data processing system. The data processing system may include a single computing device, or the functions of the components illustrated in FIG. 1 may be distributed across multiple computing devices. The data processing system may comprise a stand-alone machine that may be embodied as, for example, a server computer, a client computer, a personal computer (PC), a tablet computer, a laptop computer. Other types of computing devices may also be used to perform the automated software development techniques disclosed herein.

The example computing environment 100 includes a mutation unit 110, an artificial selection unit 120, a test environment 115, functional requirements for a target software object 135, functional requirement tests 140, base software object 105, candidate software object 125, and target software object 130. The mutation unit 110, the artificial selection unit 120, or both may be implemented as processor-executable program code that is stored in a persistent memory of the data processing system.

The example computing environment 100 can be used to automatically generate executable program code through a process of mutation and artificial selection. Biological systems can develop new forms of life through mutation and natural selection. Mutations introduce changes into biological systems of life forms. Natural selection occurs when those life forms that are best adapted to survive environmental pressures continue to survive, while those not adapted to survive these environmental pressures go extinct. The techniques disclosed herein use these concepts to automatically generate executable program code through a process of mutation and artificial selection. Mutation, as used herein, indicates a process in which a software object is altered to create a new candidate software object. Artificial selection, as used herein indicates a process in which a candidate software object generated through mutation is tested to determine whether the candidate software object is executable, and whether the candidate software object meeting one or more functional requirements of a target software object.

To generate a new software using this process, a set of functional requirements may first be developed for the target software object. A functional requirement defines a function of a target software object to be generated. A function of the software object may be defined in terms of input(s) and output(s). If a particular input or inputs are provided, then a particular output or output are expected. Defining functional requirements for software to be developed is a common practice in software development.

The functional requirements can be used to develop tests cases that can be used to determine whether a candidate software object can perform a particular functional requirement. A set of test inputs and expected outputs can be developed to test a particular functional requirement. These tests can be formalized as a set of executable scripts or program code that can be automatically executed by the artificial selection unit 120 to test whether software under development is performing as desired.

In the conventional software development process, programmers would receive the functional requirements for the software and design and implement source code for the software. The source code is a human-readable set of instructions that may be compiled or interpreted into computer executable object code or machine code. Writing source code is time consuming and requires extensive knowledge of the computer language in which the software is being developed as well as knowledge about the computing devices for which the software is being developed. Software for even simple programs can require numerous lines of code. Software for complex programs may include thousands of lines of program code and may require teams of programmers to develop. Once written, the program code may undergo numerous rounds of testing to ensure that the program code is performing as expected.

The techniques disclosed herein eliminate the need for a programmer or team of programmers to write program code. Instead, a set of functional requirements for a "target software object" can be defined, and the executable program code for the target software object can be generated automatically through an iterative process of mutation and artificial selection, which will be described in detail in the examples that follow. The target software object 130 may be a standalone program or may be a component of a suite of programs. The mutation unit 110 may perform the mutation aspect of the automated software development techniques disclosed herein, and the artificial selection unit 120 may perform the artificial selection aspects of these techniques.

The mutation unit 110 may access a base software object 105 and may also access mutation unit configuration parameters 145. The base software object 110 may be a shell of an executable program object that may serve as a framework on which the mutations can be performed. The base software object 105 may be a Portable Executable (PE) format or other executable formats. The mutation unit configuration information 145 can include information that identifies the file format of the base software object 105. The mutation unit 110 may be able to operate on multiple different executable file formats. The base software object 105 may be selected from a library of base software objects including a variety of different file formats that may be appropriate for use in various computing environment. The mutation unit configuration parameters 145 may include an identifier for the base software object 105 in the library of base software objects, and the mutation unit 110 may access the library of base software objects to obtain a copy of the base software object 105. The library may be implemented as a database or other data store in a persistent memory of the data processing system. The library may provide a user interface that permits a user to add, modify, and/or delete base software objects from the library. The mutation unit 110 may also provide a user interface that permits a user to create, view, modify, or delete mutation unit configuration parameters 145. The user interface may also permit the user to create a version of the mutation unit configuration parameters 145 for each of a plurality of target software objects 130 to be developed.

The mutation unit configuration parameters 145 may provide a memory location of the computing environment in which the base software object 105 may be located. The mutation unit configuration parameters 145 may also provide information regarding the underlying structure of the base software object 105, such as the size and/or offset of various sections or segments of the base software object 105.

For example, the base software object 105 may include a header section and a code section, and the mutation unit configuration parameters 145 may indicate where those segments are located. The header section may include information such as libraries that will be used by the base software object 105, import address tables, etc. The mutation unit 110 does not alter the information included in the header section when mutating the base software object 105 or a candidate software object 125.

Executable software consists of a sequence of bit values that represent the program code, data, and other components of the software. The mutation unit 110 may mutate the base software object 105 by altering the bits of an executable code section of the base software object 105 to generate a candidate software object 125. In some implementations, the base software object 105 may begin with a blank executable code section, and the mutation unit 110 may generate the executable program code for that section. In other implementations, the base software object 105 may include some executable program code that may already satisfy one or more of the functional requirements of the target software object 130 to be developed. In such an implementation, the mutation unit 110 may protect the functional code segment already included in the base software object 105 and begin the mutation process in a second segment of the code section of the base software object 105. The mutation unit configuration parameters 145 may specify that the base software object 105 includes a first code segment includes functional executable code. The mutation unit configuration parameters 145 may indicate an offset within the code section of the base software object 105 at which to begin the mutation process. The existing functional code will not be altered by the mutation unit 110 while still providing the opportunity to use the mutation and artificial selection techniques disclosed herein to add additional functionality to the base software object 105.

The mutation unit 110 can mutate the base software object 105 to generate a candidate software object 125. The candidate software object 125 can be output to a testing environment 115 by the mutation unit 110. The mutation unit 110 may alternatively output the candidate software object 125 to the artificial selection unit 120, or to a memory location where the artificial selection unit 120 may access the candidate software object 125 and copy the candidate software object 125 to the testing environment 115. The testing environment 115 may be an isolated computing environment where the functionality of the candidate software object 125 may be tested without the influence of any other software. In some implementations, the testing environment 115 may be implemented as a virtual machine that may emulate attributes of a computing device on which the target software object is intended to be used.

The mutation unit 110 may mutate the code section of the base software object 105 or the candidate software object 125 through a series of bitwise permutations. As discussed with respect to the preceding examples, executable program code merely consists of a sequence of one and zero bit values in a particular sequence that defined instructions, data, and other components of the executable program code. There may be more than way to implement the same functionality. Thus, there may be more than one sequence of bit values that may perform a desired function.

The mutation unit 110 uses the idea that software can be reduced to a bit pattern to generate the candidate software object 125. The code section of the candidate software object 125 may initially be blank, and the mutation unit 110 may sequentially step through each possible sequence of bits of a particular length, and (1) set the segment of the code section of the candidate software object 125 to this binary sequence; (2) place the candidate software object 125 into the test environment 115 or provide the candidate software object 125 to the artificial selection unit 120; (3) signal the artificial selection unit 115 to test the candidate software object 125; (4) receive results of the test from the artificial selection unit 115. The mutation unit 110 may lock the contents of the segment of the code section that was being permuted in response to the artificial selection unit 115 indicating that the candidate software object 125 satisfied one more of additional functional requirements. Otherwise, the mutation unit 110 may continue mutating the segment of the code section was previously mutated, by selecting a next sequence of bits to be tested and setting the value of the segment of the code section of the candidate binary software object 125 to that value. The mutation process can be used to generate fully functional target software objects 130 that satisfies one or more functional requirements of a target software object without requiring that a programmer write any program code.

The artificial selection unit 120 may access functional requirement tests 140 associated with the target software object 130. The functional requirement tests 140 may be stored in a database or other persistent memory of the computing environment 100. The functional requirement tests 140 may be a set of executable program code or scripts that test the candidate software object 125 to determine whether the candidate software object 125 is: (1) executable, and (2) satisfies one or more of the functional requirements associated with the target software object 130. The functional requirement tests 140 may include a set of one or more tests for each functional requirement of the target software object 140. The artificial selection unit 120 may execute the one or more tests associated with each functional requirement to determine whether candidate software object 125 satisfies that functional requirement. Each test may provide a set of one or more inputs that can be provided to the candidate software object and a set of one or more expected outputs associated with those inputs.

If the candidate software object 125 generates the expected output(s) for each of the tests associated with a functional requirement, then the artificial selection unit 125 can determine that the candidate software object 125 satisfies that functional requirement. If the candidate software object 125 satisfies all of the functional requirements associated with the target software object, the artificial selection unit 125 can adopt the candidate software object 125 as a fully functional software object and output the candidate software object 125 as the target software object 130.

If the candidate software object 125 satisfies a subset of one or more of the functional requirements associated with the target software object 130, the artificial selection unit 120 can send a signal to the mutation unit 110 that the candidate software object 125 satisfies one or more functional requirements. The mutation unit 110 can continue to mutate the candidate software object 125, but the mutation unit 110 may lock the current contents of a first segment of the code section of the candidate software object 125 to prevent the functional code from being inadvertently broken by further mutation of that code section. The mutation unit 110 may then begin mutating a second segment of the code section to attempt to generate executable code that satisfies at least one additional functional requirement.

If the candidate software object 125 satisfies none of the functional requirements associated with the target software object 130. The candidate software object 125 can be discarded by the artificial selection unit 125. The artificial selection unit 120 can send a signal to the mutation unit 110 that the candidate software object 125 should continue to be mutated without locking down the segment of the code section being mutated.

If the candidate software object 125 satisfied at least one functional requirement in a previous iteration of mutation and artificial selection, and the candidate software object 125 now satisfies at least one additional functional requirement in the current iteration but not all of the functional requirements of the target software object 130, the artificial selection unit 120 may send a signal to the mutation unit 110 that indicates that the candidate software object has additional functionality that should be protected. The mutation unit 110 may protect that segment of the code section of the candidate software object 125 from additional mutation, and the mutation unit 110 may continue mutating a new segment of the code section of the candidate software object 125. Examples of this process are illustrated in FIGS. 2A and 2B, which will be discussed in detail below.

Figure 2A:
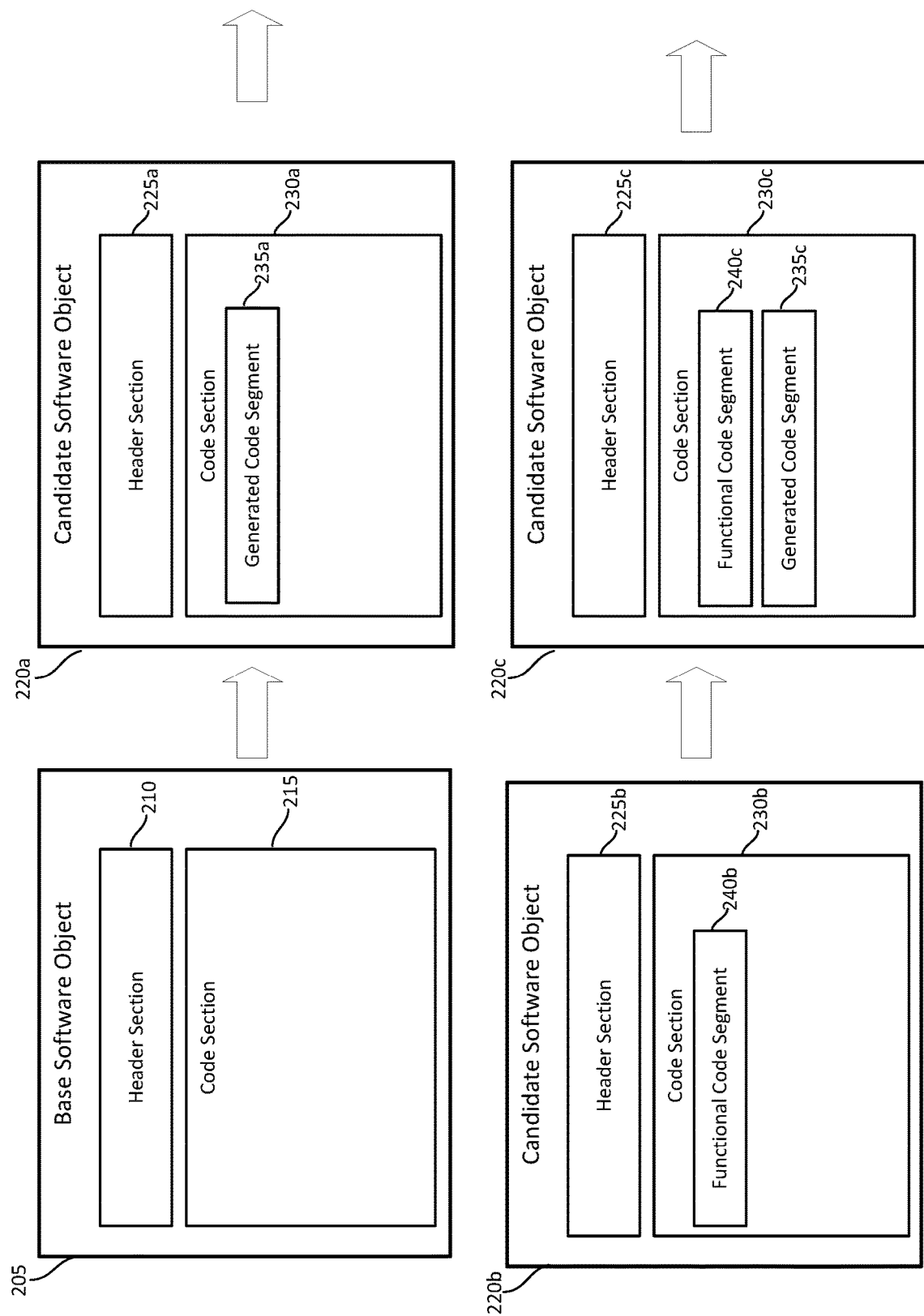
FIGS. 2A and 2B illustrate examples of automated program executable program code using mutation and artificial selection.
Figure 2B:
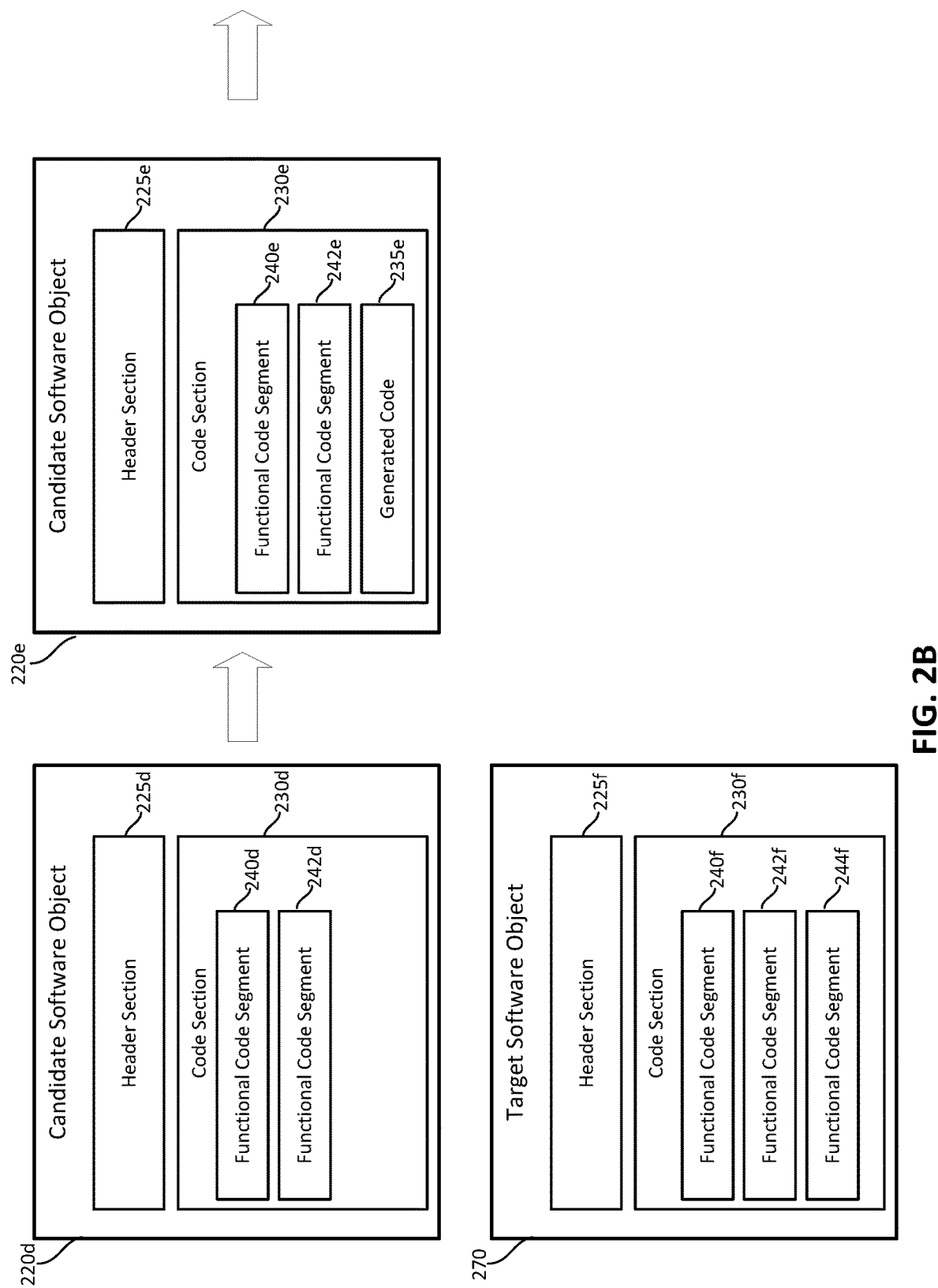

FIGS. 2A and 2B illustrate examples of automated program executable program code using mutation and artificial selection that illustrate the concepts discussed in the preceding example. In these examples, a mutation and artificial selection process are performed on a base software object 205 to generate a target software object 270. The base software object 205 includes a header section 210 and a code section 215. The header section 210 includes may include library file information, import address tables, and/or other information that support the executable code section. The header is not altered by the mutation unit 110. The base software object 205 may include other sections in addition to or instead of the header section depending upon the format of the base software object 205, and the mutation unit 110 will not alter these sections. The code section 215 in the base software object 205 is blank in this example, meaning that no functioning executable program code already exists in the base software object 205, and the base software object 205 serves as an empty framework on which the mutation unit 110 may operate.

To illustrate these concepts, the examples illustrated in FIGS. 2A and 2B illustrate the automated generation of a simple calculator program object that has only three functional requirements: (1) an addition function; (2) a subtraction function; and (3) a multiplication function. The functional requirements for this example are quite simple to illustrate the mutation and artificial selection concepts disclosed herein.

Tests associated with each of these functional requirements can be defined and added to the functional requirement tests 140, which can be executed by the artificial selection unit 120 to determine whether a candidate software object satisfies any of the functional requirements of the target software object 130. For example, a series of test inputs and expected outputs may be developed by a user to test each of the functional requirements of the calculator application. The tests may be developed as scripts or simple executable programs that provide the sets of test inputs to the candidate software object and obtain an output from the candidate software object for each of these sets of test inputs. The artificial selection unit 120 can compare the output from the candidate software object to determine whether the output matches the expected output for each test. The expected outputs in this example are simple numerical values, but the functional requirements could specify a much more complex output. For example, the target software object may receive input data and perform much more complex calculations, alterations, or other processing on the input data than the simple mathematical calculations discussed in this example.

The candidate software object 220a illustrates an example of the output of the mutation unit 110. The candidate software object 220a includes a header section 225a which may be identical to the header section 210 of the base software object 205, and a code section 230a which may be identical to the code section 215 of the base software object 205. The candidate software object 220a includes a generated code segment 235a. The generated code segment 235a consists of a set of bits generated by the mutation unit 110. The generated code segment 235a may have been generated through multiple iterations of mutations by the mutation unit 110. The candidate software object 220a may be tested by the artificial selection unit 120 to determine whether the candidate software object 220a satisfies one or more of the functional requirements associated with the target software object 130.

In this example, the artificial selection unit 120 may execute the functional requirement tests 140 on the candidate software object 220a to determine whether the candidate software object 220a satisfies at least one functional requirement of the target software object 130. In this example, candidate software object 220a satisfies a first functional requirement, such as the addition requirement for the calculator application, and in response, the artificial selection unit 120 may send an indication to the mutation unit 110 that the candidate software object 220a satisfies the first functional requirement associated with the target software object 270 but there are additional functional requirements to be satisfied.

The mutation unit 110 can generate a new candidate software object 220b based on the candidate software object 220a. The mutation unit 110 can mark the generated code segment 235a as a functional code segment 240b to indicate that the section of program code therein satisfies as functional requirement of the target software object 130 and should be preserved from additional mutation. In this example, the mutation unit may continue to mutate candidate software object 220b, because the candidate software object 220b still hasn't satisfied two of the functional requirements for the calculator application.

The mutation unit 110 mutates the candidate software object 220b to produce the candidate software object 220c. The functional code segment 242c includes the contents of the functional code segment 242b from the previous iteration of mutation. The mutation unit 110 protects the functional code segment 240c and begins mutating the contents of a second code segment, which is represented by the generated code segment 235c. The generated code 235c may include one or more iterations of mutations by the mutation unit 110 since the candidate software object 220b was first mutated.

The artificial selection unit 120 may execute the functional requirement tests 140 on the candidate software object 220c to determine whether the candidate software object 220c satisfies at least one additional functional requirement of the target software object 130. In this example, candidate software object 220c satisfies a second functional requirement, such as the subtraction requirement for the calculator application. The artificial selection unit 120 can send an indication to the mutation unit 110 that the candidate software object 220c satisfies the second functional requirement.

The mutation unit 110 can generate a candidate software object 220d based on the candidate software object 220c.

The mutation unit 110 can mark the generated code segment 235c from the candidate software as a second functional code segment 242d. Thus, the program code associated with the first two functional requirements of the target software object 130 have been satisfied, and the mutation unit 110 has protected the portions of the code section that include this code from further mutation.

The mutation unit 110 may then further mutate the candidate software object 220d to produce candidate software object 220e. Candidate software object 220e includes generated code segment 235e. The artificial selection unit 120 may execute the functional requirement tests 140 on the candidate software object 220e to determine whether the candidate software object 220e satisfies at least one additional functional requirement of the target software object 130. In this example, candidate software object 220e satisfies the third functional requirement, the multiplication requirement for the calculator application. The artificial selection unit 120 can send an indication to the mutation unit 110 that the candidate software object 220e satisfies the third and final functional requirement. The mutation unit 110 can generate a target software object 270 based on the candidate software object 220e. The target software object 270 satisfies all the functional requirements that were defined for the target software object in this example.

The target software object 270 may be added to a software database or data store. The target software object 270 may be downloaded or copied from the database or data store and may be deployed to one or more computing devices. The target software object 270 may be a component of a suite of software and may be stored with other components of the suite of software that have been successfully generated using the mutation and artificial selection techniques disclosed herein.

Figure 3:
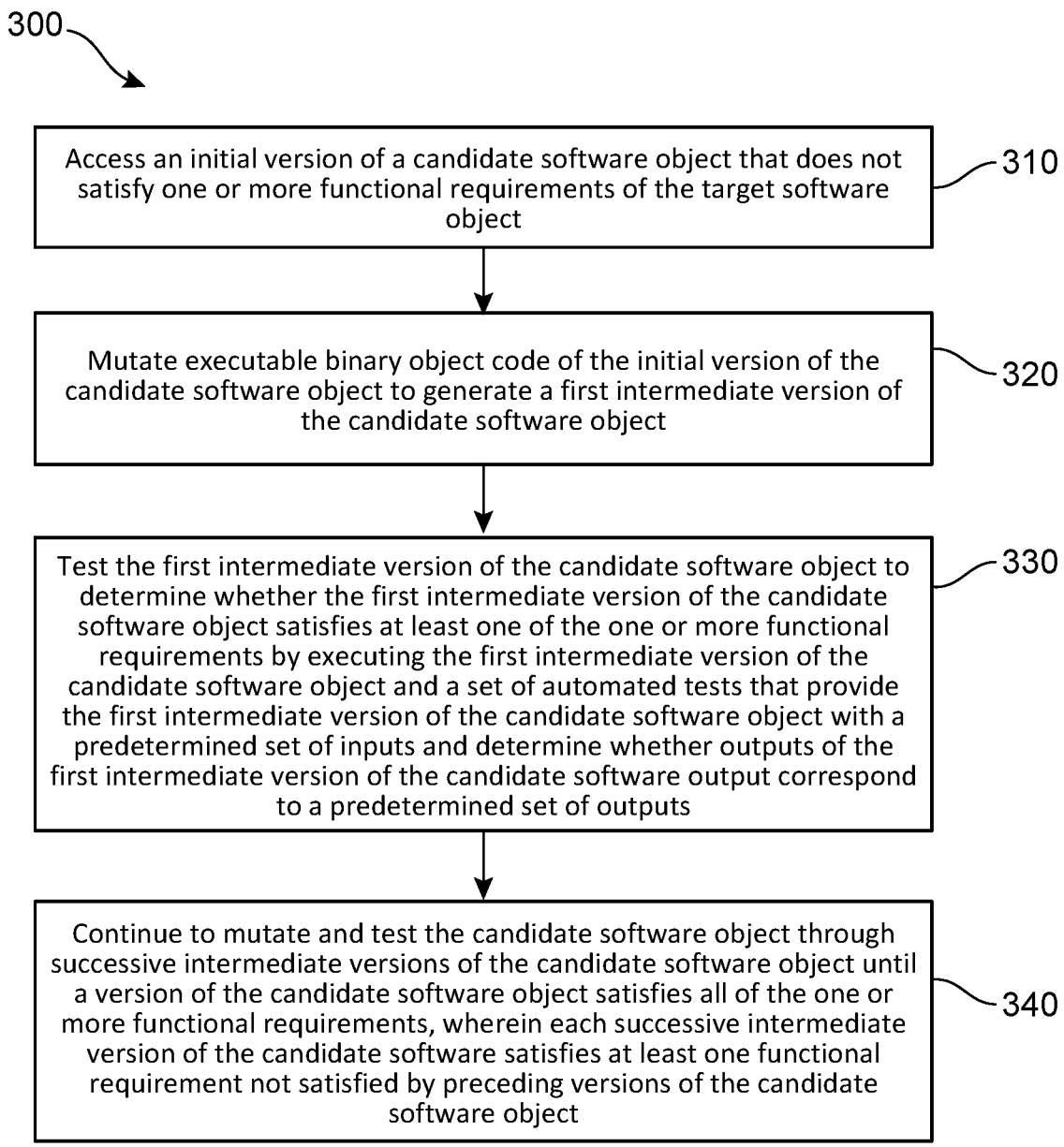
FIG. 3 presents a flowchart of an example process for generating program code using mutation and artificial selection.

FIG. 3 is a flow chart illustrating an implementation of an example process 300 executed by a data processing system for generating program code using mutation and artificial selection. In some examples, some or all of the process 300 may be performed in combination with any of the features discussed in connection with FIGS. 1 and 2A-2B. The process 300 may be implemented by a data processing system, such as the communication platform described in the proceeding examples or the example software architecture 400 illustrated in FIG. 4 and/or the example machine 500 illustrated in FIG. 5, and may be executed by a messaging application being executed on the data processing system.

The process 300 may include a first operation 310 in which an initial version of the candidate software object (also referred to herein as a base software object) that does not satisfy one or more functional requirements of the target software object. As discussed in the preceding examples, the base software object may be selected that has a code section that is essentially blank or empty with no executable code included therein. In other implementations, the base software object may include some functional executable program code. In implementations where the code section includes some functional executable program code, the mutation unit 110 can protect the existing functional code when mutating the base software object.

The process 300 may include a second operation 320 that includes mutating executable binary object code of the initial version of the candidate software object to generate a first intermediate version of the candidate software object. As discussed in the preceding examples, the mutation unit 110 can mutate the code section of a binary object to generate a new version of the candidate software object that can be tested by the artificial selection unit 120 to determine whether the new version of the candidate software object satisfies one or more functional requirements of the target software object.

The process 300 may include a third operation 330 that includes testing the first intermediate version of the candidate software object to determine whether the first intermediate version of the candidate software object satisfies at least one of the one or more functional requirements. The testing may be performed by executing the first intermediate version of the candidate software object and a set of automated functional tests that provide the first intermediate version of the candidate software object with a predetermined set of inputs and determine whether outputs of the first intermediate version of the candidate software output correspond to a predetermined set of outputs. The functional tests may be defined by a user based on the functional requirements of the target software object. The user can define a set of tests for each functional requirement in which a set of inputs is provided to the intermediate version of the candidate software object. If the outputs of the intermediate version of the candidate software object correspond to expected values for the inputs, then the intermediate version of the candidate object satisfies that test. If all of the tests associated with a functional requirement are satisfied, then the first intermediate version of the candidate software object satisfies that functional requirement. The artificial selection unit 120 send a signal to the mutation unit 110 that indicates that the first intermediate version of the candidate software object satisfies a functional requirement. The mutation unit 120 can protect the portion of the code section that includes the functional code from further mutation and create a second intermediate version of the candidate software object that can continue to be mutated and tested.

The process 300 may include a fourth operation 340 that includes continuing to mutate and test the candidate software object through successive intermediate versions of the candidate software object until a version of the candidate software object satisfies all of the one or more functional requirements. Each successive intermediate version of the candidate software satisfies at least one functional requirement not satisfied by preceding versions of the candidate software object. Through the iterative process, complex executable program code can be developed without requiring users to write the program code to perform the functions of the target software object. The software development process is an iterative process in which additional functionality may be added through each iteration of mutation and artificial selection until the desired functionality of the target software object is obtained.

The detailed examples of systems, devices, and techniques described in connection with FIGS. 1-3 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-3 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 4:
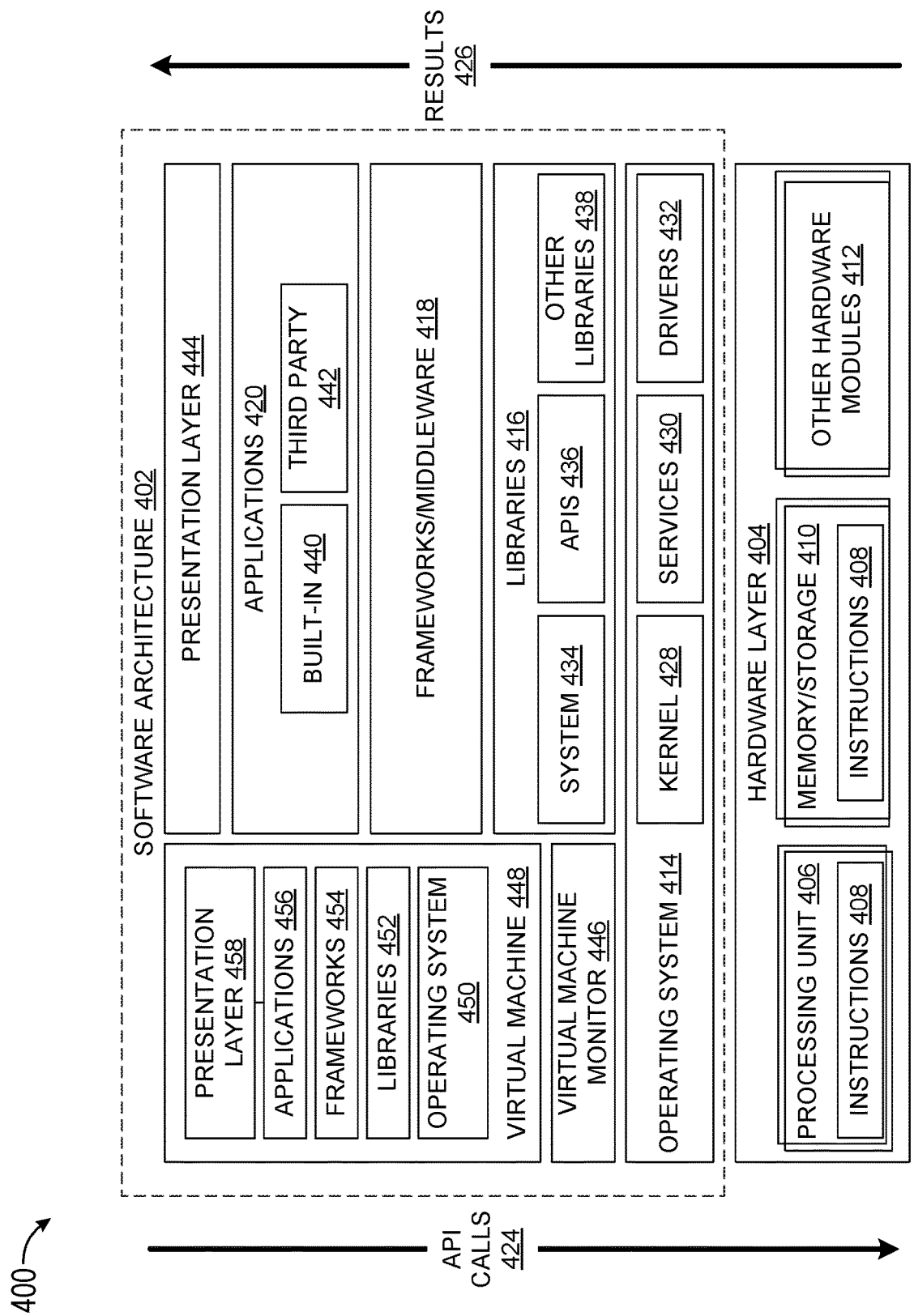
FIG. 4 is a block diagram illustrating an example software architecture, various portions of which may be used in conjunction with various hardware architectures herein described, which may implement any of the features herein described.

FIG. 4 is a block diagram 400 illustrating an example software architecture 402, various portions of which may be used in conjunction with various hardware architectures herein described, which may implement any of the above-described features. FIG. 4 is a non-limiting example of a software architecture and it will be appreciated that many other architectures may be implemented to facilitate the functionality described herein. The software architecture 402 may execute on hardware such as a machine 500 of FIG. 5 that includes, among other things, processors 510, memory 530, and input/output (I/O) components 550. A representative hardware layer 404 is illustrated and can represent, for example, the machine 500 of FIG. 5. The representative hardware layer 404 includes a processing unit 406 and associated executable instructions 408. The executable instructions 408 represent executable instructions of the software architecture 402, including implementation of the methods, modules and so forth described herein. The hardware layer 404 also includes a memory/storage 410, which also includes the executable instructions 408 and accompanying data. The hardware layer 404 may also include other hardware modules 412. Instructions 408 held by processing unit 408 may be portions of instructions 408 held by the memory/storage 410.

The example software architecture 402 may be conceptualized as layers, each providing various functionality. For example, the software architecture 402 may include layers and components such as an operating system (OS) 414, libraries 416, frameworks 418, applications 420, and a presentation layer 444. Operationally, the applications 420 and/or other components within the layers may invoke API calls 424 to other layers and receive corresponding results 426. The layers illustrated are representative in nature and other software architectures may include additional or different layers. For example, some mobile or special purpose operating systems may not provide the frameworks/middleware 418.

The OS 414 may manage hardware resources and provide common services. The OS 414 may include, for example, a kernel 428, services 430, and drivers 432. The kernel 428 may act as an abstraction layer between the hardware layer 404 and other software layers. For example, the kernel 428 may be responsible for memory management, processor management (for example, scheduling), component management, networking, security settings, and so on. The services 430 may provide other common services for the other software layers. The drivers 432 may be responsible for controlling or interfacing with the underlying hardware layer 404. For instance, the drivers 432 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 416 may provide a common infrastructure that may be used by the applications 420 and/or other components and/or layers. The libraries 416 typically provide functionality for use by other software modules to perform tasks, rather than rather than interacting directly with the OS 414. The libraries 416 may include system libraries 434 (for example, C standard library) that may provide functions such as memory allocation, string manipulation, file operations. In addition, the libraries 416 may include API libraries 436 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 416 may also include a wide variety of other libraries 438 to provide many functions for applications 420 and other software modules.

The frameworks 418 (also sometimes referred to as middleware) provide a higher-level common infrastructure that may be used by the applications 420 and/or other software modules. For example, the frameworks 418 may provide various graphic user interface (GUI) functions, high-level resource management, or high-level location services. The frameworks 418 may provide a broad spectrum of other APIs for applications 420 and/or other software modules.

The applications 420 include built-in applications 440 and/or third-party applications 442. Examples of built-in applications 440 may include, but are not limited to, a contacts application, a browser application, a location application, a media application, a messaging application, and/or a game application. Third-party applications 442 may include any applications developed by an entity other than the vendor of the particular platform. The applications 420 may use functions available via OS 414, libraries 416, frameworks 418, and presentation layer 444 to create user interfaces to interact with users.

Some software architectures use virtual machines, as illustrated by a virtual machine 448. The virtual machine 448 provides an execution environment where applications/modules can execute as if they were executing on a hardware machine (such as the machine 500 of FIG. 5, for example). The virtual machine 448 may be hosted by a host OS (for example, OS 414) or hypervisor, and may have a virtual machine monitor 446 which manages operation of the virtual machine 448 and interoperation with the host operating system. A software architecture, which may be different from software architecture 402 outside of the virtual machine, executes within the virtual machine 448 such as an OS 414, libraries 452, frameworks 454, applications 456, and/or a presentation layer 458.

Figure 5:
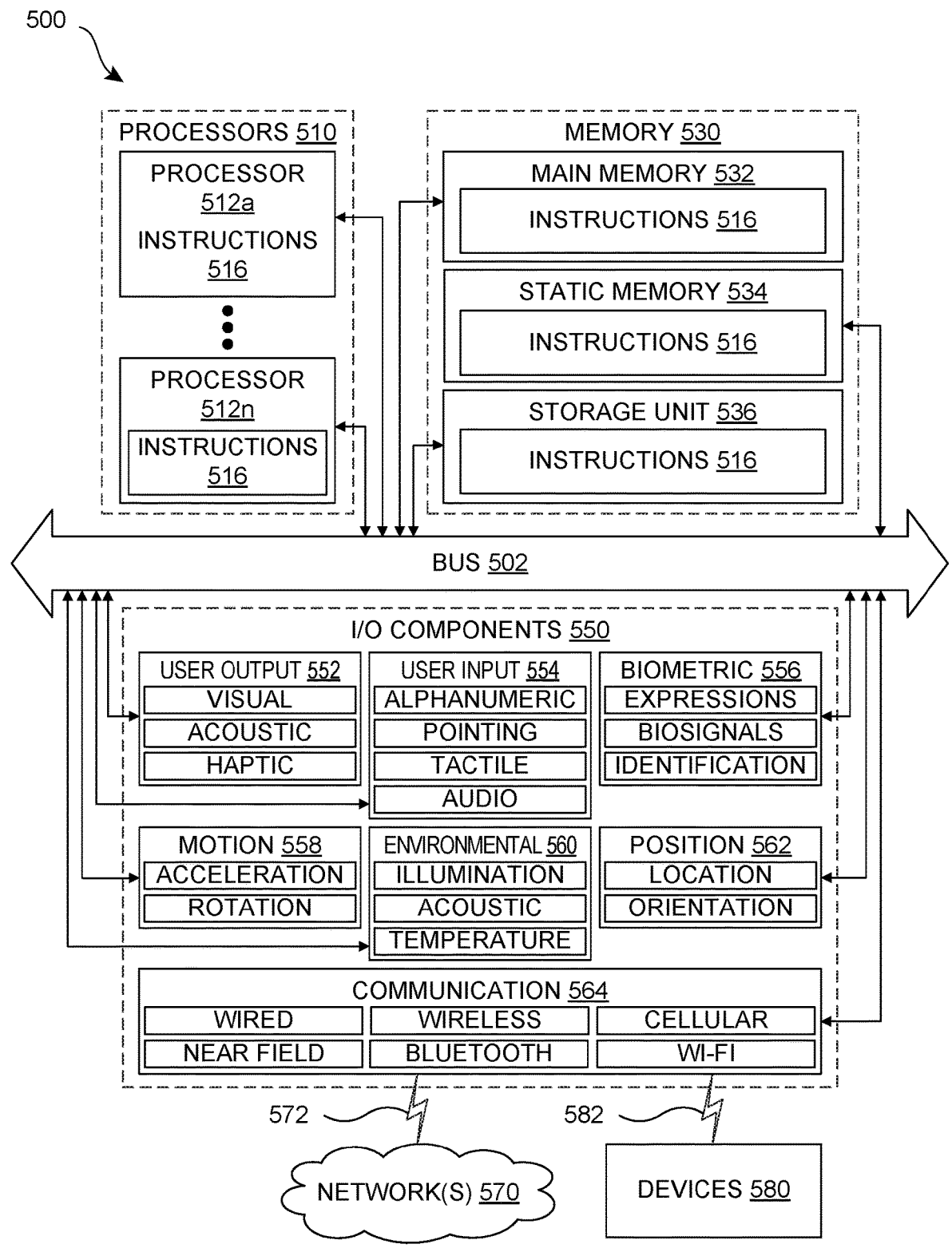
FIG. 5 is a block diagram illustrating components of an example machine configured to read instructions from a machine-readable medium and perform any of the features described herein.

FIG. 5 is a block diagram illustrating components of an example machine 500 configured to read instructions from a machine-readable medium (for example, a machine-readable storage medium) and perform any of the features described herein. The example machine 500 is in a form of a computer system, within which instructions 516 (for example, in the form of software components) for causing the machine 500 to perform any of the features described herein may be executed. As such, the instructions 516 may be used to implement modules or components described herein. The instructions 516 cause unprogrammed and/or unconfigured machine 500 to operate as a particular machine configured to carry out the described features. The machine 500 may be configured to operate as a standalone device or may be coupled (for example, networked) to other machines. In a networked deployment, the machine 500 may operate in the capacity of a server machine or a client machine in a server-client network environment, or as a node in a peer-to-peer or distributed network environment. Machine 500 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 500 is illustrated, the term "machine" includes a collection of machines that individually or jointly execute the instructions 516.

The machine 500 may include processors 510, memory 530, and I/O components 550, which may be communicatively coupled via, for example, a bus 502. The bus 502 may include multiple buses coupling various elements of machine 500 via various bus technologies and protocols. In an example, the processors 510 (including, for example, a central processing unit (CPU), a graphics processing unit (GPU), a digital signal processor (DSP), an ASIC, or a suitable combination thereof) may include one or more processors 512a to 512n that may execute the instructions 516 and process data. In some examples, one or more processors 510 may execute instructions provided or identified by one or more other processors 510. The term "processor" includes a multi-core processor including cores that may execute instructions contemporaneously. Although FIG. 5 shows multiple processors, the machine 500 may include a single processor with a single core, a single processor with multiple cores (for example, a multi-core processor), multiple processors each with a single core, multiple processors each with multiple cores, or any combination thereof. In some examples, the machine 500 may include multiple processors distributed among multiple machines.

The memory/storage 530 may include a main memory 532, a static memory 534, or other memory, and a storage unit 536, both accessible to the processors 510 such as via the bus 502. The storage unit 536 and memory 532, 534 store instructions 516 embodying any one or more of the functions described herein. The memory/storage 530 may also store temporary, intermediate, and/or long-term data for processors 510. The instructions 516 may also reside, completely or partially, within the memory 532, 534, within the storage unit 536, within at least one of the processors 510 (for example, within a command buffer or cache memory), within memory at least one of I/O components 550, or any suitable combination thereof, during execution thereof. Accordingly, the memory 532, 534, the storage unit 536, memory in processors 510, and memory in I/O components 550 are examples of machine-readable media.

As used herein, "machine-readable medium" refers to a device able to temporarily or permanently store instructions and data that cause machine 500 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 516) for execution by a machine 500 such that the instructions, when executed by one or more processors 510 of the machine 500, cause the machine 500 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 550 may include a wide variety of hardware components adapted to receive input, provide output, produce output, transmit information, exchange information, capture measurements, and so on. The specific I/O components 550 included in a particular machine will depend on the type and/or function of the machine. For example, mobile devices such as mobile phones may include a touch input device, whereas a headless server or IoT device may not include such a touch input device. The particular examples of I/O components illustrated in FIG. 5 are in no way limiting, and other types of components may be included in machine 500. The grouping of I/O components 550 are merely for simplifying this discussion, and the grouping is in no way limiting. In various examples, the I/O components 550 may include user output components 552 and user input components 554. User output components 552 may include, for example, display components for displaying information (for example, a liquid crystal display (LCD) or a projector), acoustic components (for example, speakers), haptic components (for example, a vibratory motor or force-feedback device), and/or other signal generators. User input components 554 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 550 may include biometric components 556, motion components 558, environmental components 560, and/or position components 562, among a wide array of other physical sensor components. The biometric components 556 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 558 may include, for example, acceleration sensors (for example, an accelerometer) and rotation sensors (for example, a gyroscope). The environmental components 560 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 562 may include, for example, location sensors (for example, a Global Position System (GPS) receiver), altitude sensors (for example, an air pressure sensor from which altitude may be derived), and/or orientation sensors (for example, magnetometers).

The I/O components 550 may include communication components 564, implementing a wide variety of technologies operable to couple the machine 500 to network(s) 570 and/or device(s) 580 via respective communicative couplings 572 and 582. The communication components 564 may include one or more network interface components or other suitable devices to interface with the network(s) 570. The communication components 564 may include, for example, components adapted to provide wired communication, wireless communication, cellular communication, Near Field Communication (NFC), Bluetooth communication, Wi-Fi, and/or communication via other modalities. The device(s) 580 may include other machines or various peripheral devices (for example, coupled via USB).

In some examples, the communication components 564 may detect identifiers or include components adapted to detect identifiers. For example, the communication components 564 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 562, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A computing device comprising:
   a processor; and
   a computer-readable medium storing executable instructions for causing the processor to perform operations comprising:
      accessing an initial software object that does not satisfy a plurality of functional requirements of a target software object;
      generating a first intermediate software object by mutating executable binary object code of the initial software object;
      testing the first intermediate software object by:
         executing the first intermediate software object with a predetermined input, and
         determining that an output of the first intermediate software object corresponds to a predetermined output that indicates that the first intermediate software object satisfies a first functional requirement of the plurality of functional requirements;
      locking a first portion of the executable binary object code preventing the first portion of the executable binary code from being further mutated responsive to the first intermediate software object satisfying the first functional requirement; and
      continuing to mutate and test the first intermediate software object until a version of the first intermediate software object satisfies all of the plurality of functional requirements of the target software object, wherein each successive intermediate version satisfies at least one additional functional requirement not satisfied by preceding versions of the first intermediate software object.

2. The computing device of claim 1, responsive to the first intermediate version software object not satisfying the first functional requirement of the plurality of functional requirements, iteratively mutating and testing the first intermediate software object by:
   further mutating the first intermediate software object; and
   testing the further mutated first intermediate software object to determine whether the further mutated first intermediate software object satisfies at least one of the plurality of functional requirements of the target software object.

3. The computing device of claim 1, wherein mutating the first intermediate software object includes adding at least one bit to the first intermediate software object.

4. The computing device of claim 3, wherein adding the at least one bit to the first intermediate software object comprises adding the at least one bit to a code section of the first intermediate software object.

5. The computing device of claim 4, wherein continuing to mutate the first intermediate software object further comprises:
   adding one or more bits to a second portion of the code section of the first intermediate software object.

6. The computing device of claim 1, wherein testing the first intermediate software object includes:
   executing one or more tests associated with a first functional requirement of the one or more functional requirements; and
   determining that the candidate software object satisfies the first functional requirement responsive to the candidate software object passing all the one or more tests associated with the first functional requirement.

7. A method performed by a data processing system for automatically generating a target software object comprising:
   accessing via a processor an initial software object that does not satisfy a plurality of functional requirements of a target software object;
   generating via the processor a first intermediate software object by mutating executable binary object code of the initial software object;
   testing via the processor the first intermediate software object by:
      executing the first intermediate software object with a predetermined input; and
      determining that an output of the first intermediate software object corresponds to a predetermined output that indicates that the first intermediate software object satisfies a first functional requirement of the plurality of functional requirements;
   locking a first portion of the executable binary object code preventing the first portion of the executable binary code from being further mutated responsive to the first intermediate software object satisfying the first functional requirement; and continuing to mutate and test the first intermediate software object until a version of the first intermediate software object satisfies all the plurality of functional requirements of the target software object, wherein each successive intermediate version satisfies at least one additional functional requirement not satisfied by preceding versions of the first intermediate software object.

8. The method of claim 7, responsive to the first intermediate version software object not satisfying the first functional requirement of the plurality of functional requirements, iteratively mutating and testing the first intermediate software object by:
further mutating the first intermediate software object; and
testing the further mutated first intermediate software object to determine whether the further mutated first intermediate software object satisfies at least one of the plurality of functional requirements of the target software object.

9. The method of claim 7, wherein mutating the first intermediate software object includes adding at least one bit to the first intermediate software object.

10. The method of claim 9, wherein adding the at least one bit to the first intermediate software object comprises adding the at least one bit to a code section of the first intermediate software object.

11. The method of claim 10, wherein continuing to mutate the first intermediate software object further comprises:
adding one or more bits to a second portion of the code section of the first intermediate software object.

12. The method of claim 7, wherein testing the first intermediate software object includes:
executing via the processor one or more tests to determine whether the first intermediate software object satisfies a respective software requirement of the one or more functional requirements; and
determining via the processor that the respective software requirement has been satisfied responsive to the first intermediate software object passing the one or more tests.

13. A memory device storing instructions that, when executed on a processor of a computing device, cause the computing device to automatically generate a target software object, by:
accessing an initial software object that does not satisfy a plurality of functional requirements of a target software object;
generating a first intermediate software object by mutating executable binary object code of the initial software object;
testing the first intermediate software object by:
executing the first intermediate software object with a predetermined input; and
determining that an output of the first intermediate software object corresponds to predetermined output that indicates that the first intermediate software object satisfies a first functional requirement of the plurality of functional requirements;
locking a first portion of the executable binary object code preventing the first portion of the executable binary code from being further mutated responsive to the first intermediate software object satisfying the first functional requirement; and
continuing to mutate and test the first intermediate software object until a version of the first intermediate software object satisfies all the plurality of functional requirements of the target software object, wherein each successive intermediate version satisfies at least one additional functional requirement not satisfied by preceding versions of the first intermediate software object.

14. The memory device of claim 13, responsive to the first intermediate version software object not satisfying the first functional requirement of the plurality of functional requirements, iteratively mutating and testing the first intermediate software object by:
further mutating the first intermediate software object; and
testing the further mutated first intermediate software object to determine whether the further mutated first intermediate software object satisfies at least one of the plurality of functional requirements of the target software object.

15. The memory device of claim 13, wherein mutating the first intermediate software object includes adding at least one bit to the first intermediate software object.

16. The memory device of claim 15, wherein adding the at least one bit to the first intermediate software object comprises adding the at least one bit to a code section of the first intermediate software object.

17. The memory device of claim 16, wherein continuing to mutate the first intermediate software object further comprises:
adding one or more bits to a second portion of the code section of the first intermediate software object.

18. The computing device of claim 1, wherein continuing to mutate and test the first intermediate software object includes locking a respective portion of the executable binary object code associated with the at least one additional functional requirement responsive to the first intermediate software object satisfying the at least one additional functional requirement.

* * * * *